United States Patent [19]

Cusano et al.

[11] 4,262,202

[45] Apr. 14, 1981

[54] SCINTILLATOR DETECTOR ARRAY

[75] Inventors: Dominic A. Cusano, Schenectady, N.Y.; Frank A. Di Bianca, Mukwonago, Wis.

[73] Assignee: General Electric Company, Schenectady, N.Y.

[21] Appl. No.: 69,778

[22] Filed: Aug. 27, 1979

[51] Int. Cl.³ .......................... G01T 1/20; G02F 1/13
[52] U.S. Cl. .................................. 250/366; 250/367; 250/445 T; 350/335
[58] Field of Search ................ 250/361 R, 363 S, 366, 250/367, 368, 445 T; 252/301.17, 301.18; 350/330, 335

[56] References Cited

U.S. PATENT DOCUMENTS

| | | | |
|---|---|---|---|
| 2,750,514 | 6/1956 | Armistead | 250/361 R |
| 3,244,637 | 4/1966 | Tsou et al. | 252/301.18 |
| 3,293,432 | 12/1966 | McCall et al. | 250/361 R |
| 4,187,427 | 2/1980 | Cusano | 250/367 |

*Primary Examiner*—Alfred E. Smith
*Assistant Examiner*—Janice A. Howell
*Attorney, Agent, or Firm*—Alexander M. Gerasimow; Marvin Snyder; James C. Davis

[57] ABSTRACT

A scintillator detector array particularly useful in computerized tomography comprises a housing including a plurality of walled cellular chambers, said housing having a front wall member transmissive to x-ray radiation and whose chambers are defined by side wall members comprising materials, such as tungsten and tantalum, which are substantially opaque to x-ray radiation. Within the housing there is disposed a liquid scintillation medium including a soluble fluor and solvent material for the fluor. The solvent may comprise either an intrinsically high Z solvent or may be a solvent which has dissolved therein a high Z compound. Also disposed about the cellular chambers are a plurality of photoelectrically responsive devices. The detector array operates to convert x-ray intensity levels of impinging x-ray radiation to related electrical signal intensity levels.

11 Claims, 2 Drawing Figures

SCINTILLATOR DETECTOR ARRAY

BACKGROUND OF THE INVENTION

This invention relates to x-ray detectors and more particularly to x-ray detectors which are useful in computerized tomography applications.

Computerized tomography scanners are medical diagnostic instruments in which the subject is exposed to a relatively planar beam or beams of x-ray radiation whose intensity varies in a direct relationship to the energy absorption along a plurality of subject body paths. By measuring the x-ray intensity, that is, the x-ray absorption, along these paths from a plurality of different angles, that is, different views, an x-ray absorption coefficient can be computed for various areas in the plane of the body through which the radiation passes. These areas typically correspond to an approximately square portion having dimensions of approximately 1 mm $\times$ 1 mm. These absorption coefficients are used to form a display of the bodily organs intersected by x-ray beams. An integral and important portion of these scanners is the x-ray detector which receives the x-ray radiation which has been modulated by passage through the particular body under study. The detector functions to convert the resultant x-ray intensity level information to electrical signals which are then typically converted to a digital form to be processed by digital computer means which generates the absorption coefficients in a form suitable for display on a cathode ray tube screen or other, permanent media.

Conventional detectors used in computerized tomography are of two basic kinds. The first kind employs a scintillator crystal material while the second employs high pressure xenon gas as the detection medium.

In the scintillator crystal detector, a plurality of scintillator crystal slabs are separated by collimating plates comprising material such as tungsten or tantalum. The detectors based on crystal scintillators exhibit certain desirable properties, namely, they have a high overall quantum detection efficiency (better then 90 percent) and also exhibit a low attenuation length. For example, approximately 30 percent of the impinging x-ray photons from a 73 KeV x-ray beam are absorbed in a length of approximately 1 mm. In other words, approximately 97 percent of the impinging x-ray photons are absorbed in three "stopping distances", that is, approximately 3 mm. However, crystal scintillators exhibit other properties which are undesirable in computerized tomography applications. For example, crystal scintillators generally exhibit a poor spectral linearity. This is particularly important in the case of x-ray detectors since x-ray beams cannot, at present, be produced which exhibit a monochromatic frequency. Additionally, certain crystal scintillator materials such as cesium iodide (CsI) exhibit unsatisfactory afterglow characteristics. That is to say, certain crystal scintillator materials still produce optical wavelength radiation 100 microseconds after excitation. These afterglow characteristics render certain of these crystal scintillator materials unsatisfactory for rapid scanning which is particularly desirable in the event that moving bodily organs such as the heart and lungs and even the gastrointestinal tract are being studied. Moreover, solid crystal scintillator materials exhibit certain other problems. Among these are potential non-uniformities from crystal imperfections or machining scratches or cracks; quantum detection efficiency losses from gaps between crystals and adjacent collimator plates; and detector failure if just 1 of up to 1,000 crystals becomes dislodged or mispositioned; and view-to-view crosstalk from the fluorescent decay tails, especially for continuous, as opposed to pulsed, x-ray beam operation.

The other commonly used kind of x-ray detector for computerized tomography applications is the xenon detector. In this detector, closely spaced electrically conductive collimating plates are disposed in a housing containing xenon gas at a pressure of approximately 25 atmospheres. Adjacent plates are maintained at opposite high electric potentials and the operation of the detector depends upon the production of electrons from the xenon gas by the impinging x-ray photons. These electrons drift under the influence of the applied voltage to the anode detector plate and a current results depending upon the intensity of the impinging x-ray beam. These xenon detectors respond to impinging x-ray radiation in several microseconds and exhibit an overall quantum detection efficiency of less than approximately 70 percent. Moreover, they exhibit a 30 percent stopping distance of approximately 16 mm, which is longer than desired, but not prohibitively long. Xenon detectors exhibit excellent spatial homogeneity since xenon is a gaseous medium but like crystal scintillators, exhibit poor spectral linearity. For example, the ratio of the attenuation length for 110 KeV photons to the attenuation length for 40 KeV photons is approximately 15:1, as is also the case for crystal scintillators, such as CsI and BGO (bismuth germanate, $Bi_4Ge_3O_{12}$). There also other problems associated with the high pressure xenon detector. In particular, because of the need for a high gas pressure, a housing is required with a front wall comprising a material which is relatively transparent to x-ray radiation but which is structurally sound. The housings typically comprise aluminum, which while being structurally sound, does absorb a certain number of x-ray photons which are not therefore subsequently used to indicate the x-ray intensity level. Additionally, minute movements of the collimator plates which result from movement of the scanner gantry or from other vibrational sources, often produce microphonic noise which can produce image artifacts. This microphonic noise arises at least in part because of the necessity of maintaining adjacent plates at opposite but high electric potentials.

As used above, the term "quantum detection efficiency" refers to the fractional number of x-ray photons which are absorbed photoelectrically in the detection medium, whether the medium be a crystal or a gas. Another term of merit which is often applied to these x-ray detectors is the "conversion efficiency" which includes losses due to the photodetector system that is employed. For example, the conversion efficiency for a gridded xenon detector system is approximately 8 percent while the conversion efficiency for a scintillator crystal employing CsI is approximately 15 percent.

SUMMARY OF THE INVENTION

In accordance with a preferred embodiment of the present invention, a scintillation detector array for use in computerized tomographic applications includes a housing for holding a liquid scintillation medium, said housing having a plurality of walled cellular chambers with the front of the housing having a wall structure substantially transmissive to x-ray radiation and with the chambers within the housing being defined by side wall members (collimators) which are substantially opaque to x-ray radiation and which are oriented substantially perpendicular to the front wall structure. Within the housing there is disposed a liquid scintillation medium including a soluble fluor and a solvent material. The solvent material is either an intrinsically high Z solvent or a solvent having a high Z compound dissolved therein. Photoelectrically responsive devices are disposed about the cellular chambers, either inside or outside of the housing itself. The liquid scintillation medium substantially fills the housing and provides an extremely homogeneous medium which avoids many of the problems associated with both the xenon and crystal detector arrays described above. Additionally, there may be included within the liquid scintillator medium quantities of conversion substances which act to convert the optical output of the primary fluor to an optical wavelength which is more suitable for detection by the photoelectrical means. Additionally, if desired, the interior walls of the chambers are coated with a reflective material to increase optical photon capture by the photoelectric devices.

Accordingly, it is an object of the present invention to provide a scintillator detector array particularly useful in computerized tomography applications, which employs a liquid scintillation medium which exhibits a high degree of quantum detection efficiency and short attenuation length.

DETAILED DESCRIPTION OF THE INVENTION

Figure 1:
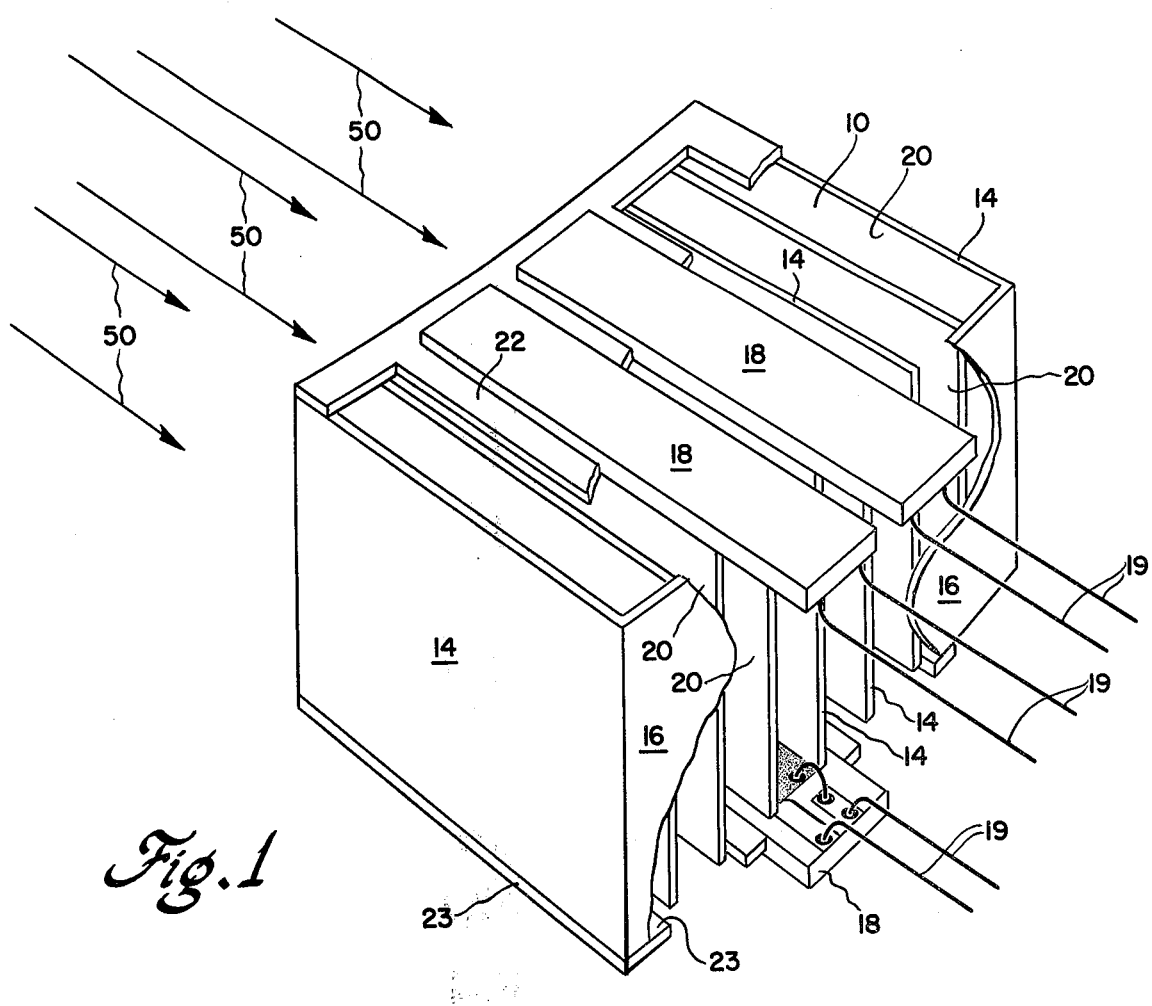
FIG. 1 is a perspective view illustrating a scintillator detector array of the present invention employing a liquid scintillation detecting medium.

The scintillator detector array of the present invention comprises three basic portions, namely, a housing, a liquid scintillation medium disposed within the housing, and photoelectrically responsive detectors disposed about the cells within the housing. Each of these elements are discussed below.

In particular, the housing of the present invention comprises any convenient nonreactive material suitable for holding a liquid. A plastic such as LEXAN ®, for example, is such a suitable material. Particularly when employed in fan beam scanner designs, the housing is preferably arcuate in shape. Generally, the housing is divided into interior cellular chambers, each having substantially the same dimensions. At least one wall of the housing, herein referred as the front wall, comprises a material which is highly transmissive of x-ray radiation, such as an inert low Z plastic. The cellular chambers are preferably defined in the housing by collimation plates which are oriented substantially orthogonally to the front wall of the housing. Slots in the housing interior may be conveniently provided for insertion and alignment of these collimation plates. For the situation in which a fan beam scanner is employed, the front wall member is preferably arcuate and if comprising a plastic such as LEXAN, is preferably approximately 0.5 mm thick. The collimator plates comprise a high Z material which is substantially opaque to x-ray radiation. The collimation plates preferably comprise tungsten or tantalum plates approximately 2 to 4 mils in thickness. The plates may be fixed within the housing and in particular within the slots in the housing through the use of any convenient inert adhesive material, such as epoxy. The housing itself is also preferably provided with a common drain, and if necessary, a fill vent for use in adding the liquid scintillator material. This liquid material typically fills the entire volume of the interior of the housing which is preferably configured and dimensioned so that each cellular chamber is in fluid communication with the other chambers, so as to maintain a spatially uniform distribution of liquid scintillation material throughout the interior of the housing. This particular housing configuration cooperates with the employment of liquid scintillation material to provide significant advantages for this scintillation detector design. In particular, as more advanced liquid scintillation materials are developed, the housing is easily emptied and refilled with minimal inconvenience and minimal "down time" for the tomographic scanner. Additionally, it is to be noted that the detector array of such a tomography scanner may employ the detector housing of the present invention in a modular configuration.

Many of the advantages of the present invention arise from the use of a liquid scintillation detector medium. While liquid scintillator materials have been known for many years, they have never heretofore been employed in computerized tomography detectors arrays. Conventional liquid scintillation materials have not been employed for this purpose since in these materials the impinging high energy x-ray photons interact with the material primarily by undergoing a Compton scattering in which the x-ray photon is not absorbed but is rather deflected. Because of the high resolution requirements for computerized tomography, the detector cells must be rather closely spaced (1 mm or less) and the resulting Compton scattered x-ray photons are simply deflected into the collimator plates where they are absorbed. The absorption in the collimation plates of such an x-ray photon produces no optical wavelength output and merely results in heating of the collimator plates. Additionally, conventional liquid scintillation detecting material exhibits a low x-ray photon absorption (i.e., low quantum detection efficiency) so that x-ray photons which are not scattered may be absorbed but are absorbed only after a deep penetration of the detecting medium. Such a detector employed in tomographic applications requires a very deep detector cell of approximately 200 mm long. Even if such a detector were constructed, the Compton scattering that would occur along the entirety of this length would still act to significantly reduce the quantum detection efficiency of such a detector to be below acceptable levels.

However, certain liquid scintillation materials may be combined in a suitable solvent with high Z compounds to increase the x-ray absorption and quantum detection efficiency for these scintillation materials. Before it is known whether any given scintillator material may be effectively employed in a computerized tomography detector application, certain critical properties of the material should be known. Some of these key properties includes its attenuation length, that is, the depth of penetration over which approximately 37 percent (1/e) of the x-ray photons are absorbed. Other critical properties include its fluorescence speed, its afterglow characteristics, its spectral linearity, and its long-term chemical stability, particularly upon exposure to x-ray radiation. The use of organic compounds containing high Z atoms, such as tin or lead, is known to increase the absorption capabilities of certain liquid scintillator materials. For example, such a lead based compound appears to be disclosed in U.S. Pat. No. 3,244,637, issued Apr. 5, 1966 to Tsou et al. Also described therein is the effect known as fluorescence quenching in which it is observed that increasing the level of concentration of lead compounds increases the ratio of nonradiative to radiative fluorescent transitions. That is to say, increasing the concentration of lead generally reduces the optical wavelength output of the primary fluor even though the level of x-ray photon absorption increases. Thus, loading liquid scintillators with high Z compounds produces effects from two sources. First there is a geometric effect which tends to increase the x-ray absorption as the level of high Z compound concentration increases since fewer x-ray photons escape through Compton scattering. Second, there is a decrease in optical wavelength output from the primary fluor because of the fluorescence quenching effect. These combined effects often give rise to a nonlinear variation in optical output as the concentration of high Z compound is increased. It is, therefore, often seen, as this concentration is increased, the optical output increases until it reaches a plateau level where the quenching effect is greatest but after which there is a sharp increase with increased absorption obtained through the higher concentration of high Z molecules.

Accordingly, the liquid scintillation medium employed in the present invention includes a soluble fluor and a solvent material for said fluor. Moreover, the solvent is either itself an intrinsically high Z solvent or is capable of having dissolved therein a high Z compound. Typical soluble fluors which may be employed in the present invention include p-terphenyl, biphenyloxazole, butyl-phenyl-biphenylyl-oxadiazole, tetramethyl-p-quaterphenyl, isopropyl biphenyl or bis phenylethynyl anthracene. The solvent typically comprises toluene, xylene, or trimethyl benzene. The fluor is typically dissolved in the solvent up to its solubility limit or just below it, so as to obtain the maximum optical output. If the solvent itself comprises a high Z material, it is said to be intrinsically loaded and it is generally unnecessary to also employ a separate high Z compound acting as an x-ray absorber. Typical intrinsically loaded solvents include iodo-naphthalene and bromo-naphthalene. If the solvent is not intrinsically loaded, certain high Z organic solutes may be added to increase the x-ray absorption. Typical amongst these are the lead and tin alkyls. Additionally, the above mentioned quenching effect can be reduced in several different ways. For example, it has been found that naphthalene as an additive reduces the quenching effect. Also, the solvent isopropyl biphenyl exhibits four times less quenching than toluene for mercury compounds. It is to be noted that mercury has an atomic number (that is, Z) of 80, which is only 2 less the atomic number for lead, which is 82. Also, the high Z solute, such as tetramethyl lead may be buffered by employing tetramethyl p-quaterphenyl as a solvent. Additionally, the liquid scintillator medium is carefully de-oxygenated for stability and light output improvement. The array is preferably sealed with an internal atmosphere of oxygen-free nitrogen.

In the case that an absorber material is added to the solvent, for example, a tin or lead alkyl and trimethyl benzene, the absorber compound may be added in a concentration of from approximately 1 to approximately 30 percent (by weight) with a concentration of 10 percent being preferred. All of the liquid scintillator materials described immediately above are particularly suitable for use in computerized tomography applications. In particular, their primary fluorescence speed is measured in nanoseconds rather than in microseconds as in either xenon or solid crystal scintillation detectors. Moreover, the quantum detection efficiency is approximately 90 percent with an attenuation length of approximately 7 mm. The spatial homogeneity of the liquid detecting medium is as uniform as possible and there is no problem with microphonic noise. Additionally, the liquid scintillator material generally exhibits a relatively high degree of spectral linearity. In particular, the ratio of attenuation length for 110 KeV photons to the attention length for 40 KeV photons is approximately 2:1 as compared to 15:1 for either the xenon or solid crystal scintillator structures. Additionally, the minimum cell size for the detector of the present invention is reduced by a factor of 2 to approximately 0.5 mm, thus providing greater image resolution.

Because the photoelectrically responsive devices conventionally used for converting the optical output of the fluor are generally sensitive over a limited spectral range, typically in the red region, one or more soluble wavelength conversion fluors may be added to the mixture of solvent, fluor, and high Z absorber. Such materials typically comprise dimethyl POPOP (1,4-bis-[methyl-5-phenyloxazolyl)] benzene), α-NPO (2-[1-naphthyl]-5-phenyloxazole), bis MSB (p-bis[0-methyl-styryl]benzene), rhodamine B, perylene, or BPEA (9,10-bis[phenyl-ethynyl]anthracene). These materials act to absorb the optical wavelength radiation generated by the soluble primary fluor and to reradiate it at a different frequency which is more compatible with the spectral response of the photodetectors.

The third part of the scintillation detector of the present invention comprises suitable photoelectrically responsive devices which are typically disposed within or about the individual cellular chambers of the detector array. These devices may include photodiodes and in particular the efficient JMOS photodiodes.

FIG. 1 illustrates a scintillation detector array in accordance with a preferred embodiment of the present invention in which there is shown x-rays 50 impinging upon the front wall of the array. The housing comprises, for example, an upper ceiling member 22 and a lower floor member 23 and a back wall member 16. Front wall member 11 is not seen in FIG. 1. Within the housing there are disposed collimator plates 14 oriented substantially orthogonal to the front wall member. Photoelectrically responsive devices 18 are disposed in an alternating top and bottom pattern along the floor and ceiling portions of the array. These typically comprise photodiodes which are electrically connected to analog digital conversion means through leads 19. Additionally, if desired, the interior walls of the chambers may be coated, except of course over the photodiodes, with a reflective material 20. This material may be provided both on the collimator plates 14 and on the front wall member. Within each defined cell there is disposed liquid scintillation medium 10, sealed therein.

Figure 2:
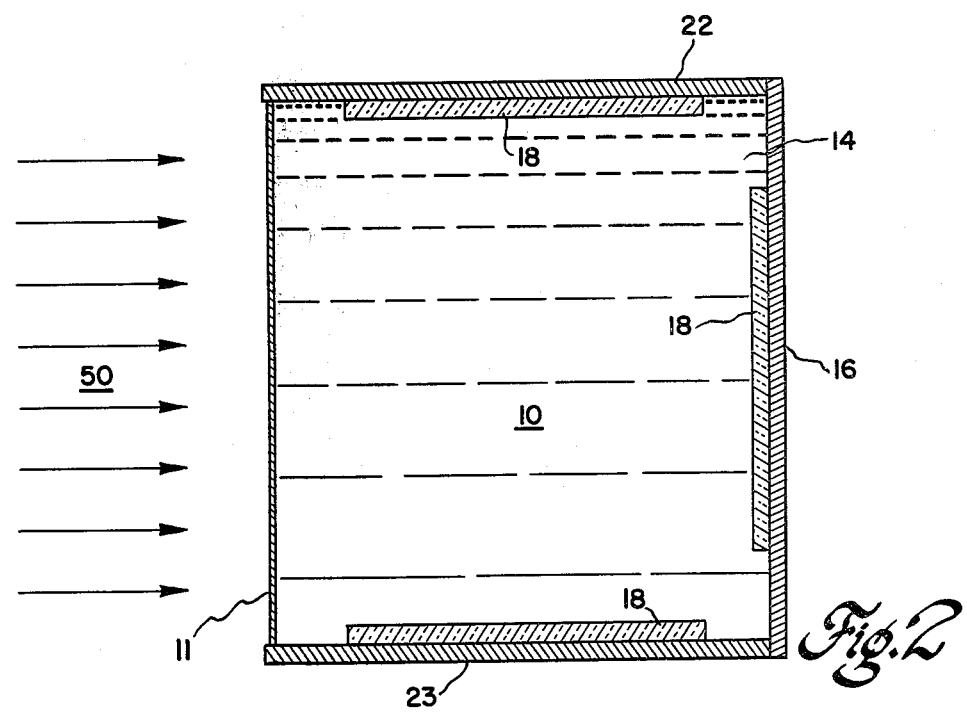
FIG. 2 is a cross-sectional side elevation view through a single cell of the present invention.

FIG. 2 illustrates a cross section through a single cell of a scintillation detector array configured somewhat differently than that shown in FIG. 1. In particular, FIG. 2 illustrates alternate placement arrangements for the photoelectrically responsive devices 18. This configuration is more easily manufactured and places the devices 18 directly within the cellular chambers. For optimal light gathering capabilities a photodetector may be provided both at the top, bottom, and back of each such chamber. While the housing shown in FIGS. 1 and 2 suggests distinct floor, ceiling, back wall, and front wall members, these members typically comprise a single unit having a single material constituent.

From the above, it may be appreciated that the scintillation detector array of the present invention offers significant advantages for use in computerized tomography than is presently provided by either the xenon or solid scintillator crystal detector arrays. For example, the cost of the liquid scintillator material is extremely low, particularly in comparison to the crystal detectors and as improvements in the liquid scintillator medium are made, the detecting system may be easily drained and refilled with the improved material. The detector array of the present invention is particularly suitable in high speed computerized tomography scanning since it exhibits a primary fluorescence speed of approximately 2.7 nanoseconds with negligible afterglow characteristics. With an attenuation length of approximately 6 mm, it is superior to the xenon detectors and exhibits better spectral linearity than either the xenon or solid crystal detectors. There is a lesser degree of collimator plate bowing than occurs in certain xenon detectors and accordingly, the detector of the present invention is highly stable in terms of temporal drift. In addition to all of the above advantages, the scintillator detector array of the present invention is extremely easily manufactured from inexpensive components and materials.

While this invention has been described with reference to particular embodiments and examples, other modifications and variations will occur to those skilled in the art in view of the above teachings. Accordingly, it should be understood that within the scope of the appended claims, the invention may be practiced otherwise than is specifically described.

The invention claimed is:

1. A scintillator detector array particularly useful in computerized tomography comprising:
   a housing for holding a liquid scintillation medium, said housing including a plurality of walled cellular chambers, said housing having a front wall structure substantially transmissive to x-ray radiation, said chambers being defined by side wall members which are substantially opaque to x-ray radiation and which are substantially orthogonal to said front wall structure;
   a liquid scintillation medium including a soluble fluor and a solvent material for said fluor, said solvent material being selected from the group consisting of a solvent having a high Z compound dissolved therein and an intrinsically high Z solvent; and
   a plurality of photoelectrically responsive devices disposed about said cellular chambers so as to receive optical wavelength photons produced by said scintillation medium.

2. The scintillation detector array of claim 1 in which said soluble fluor is selected from the group consisting of p-terphenyl, diphenyl oxazole, butyl-phenyl-biphenylyl-oxadiazole, tetramethyl-p-quaterphenyl, isopropyl biphenyl, and bis phenylethynyl anthracene.

3. The scintillation detector array of claim 1 in which said solvent is selected from the group consisting of toluene, xylene, and trimethyl benzene.

4. The scintillation detector array of claim 3 in which said high Z compound is selected from the group consisting of lead alkyl and tin alkyl.

5. The scintillation detector array of claim 1 in which said intrinsically high Z solvent is selected from the group consisting of iodo-naphthalene and bromo-naphthalene.

6. The scintillation detector array of claim 1 in which said liquid scintillation medium further includes at least one wavelength conversion substance selected from the group consisting of dimethyl POPOP, $\alpha$-NPO, bis MSB, rhodamine B, perylene, and BPEA.

7. The scintillation detector array of claim 1 in which said front wall structure comprises plastic.

8. The scintillation detector array of claim 1 in which said cellular chambers are in fluid communication.

9. The scintillation detector array of claim 1 in which said side wall members comprise material selected from the group consisting of tungsten and tantalum.

10. The scintillation detector array of claim 1 in which said interior cellular chamber walls are coated with reflective material.

11. The scintillation detector array of claim 1 in which said photoelectrically responsive devices are disposed within the cellular chambers.

* * * * *